Figure 1:
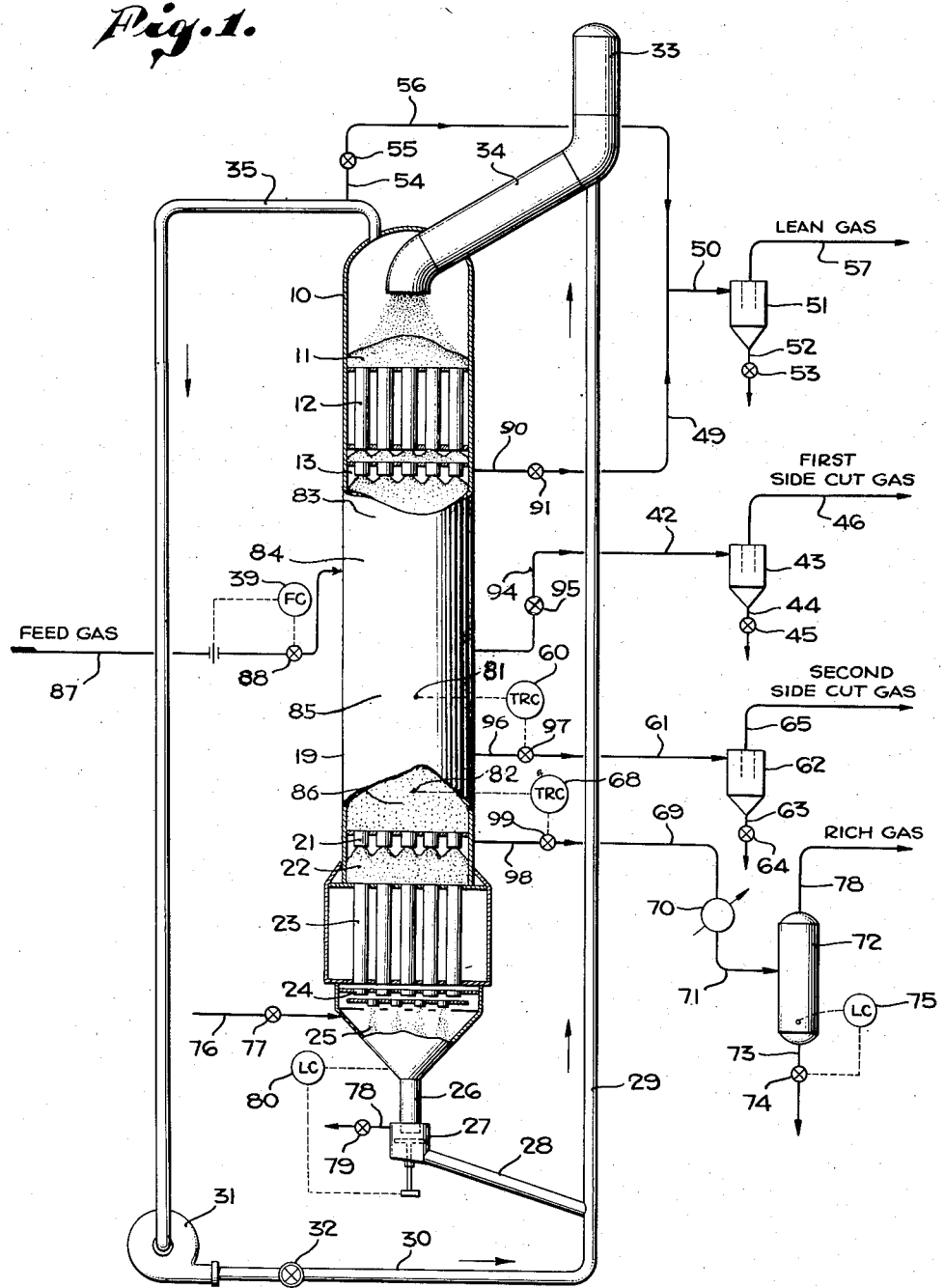

Nov. 20, 1951  C. H. O. BERG  2,575,520
ADSORPTION PROCESS
Filed June 19, 1947  2 SHEETS—SHEET 1

INVENTOR.
BY Clyde H. O. Berg
Ross J. Garofalo
ATTORNEY

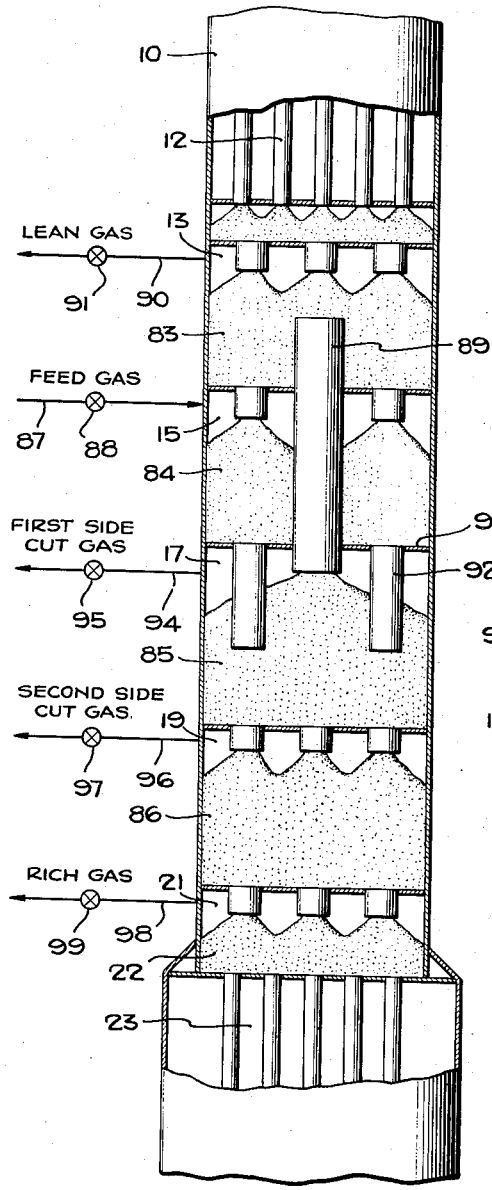
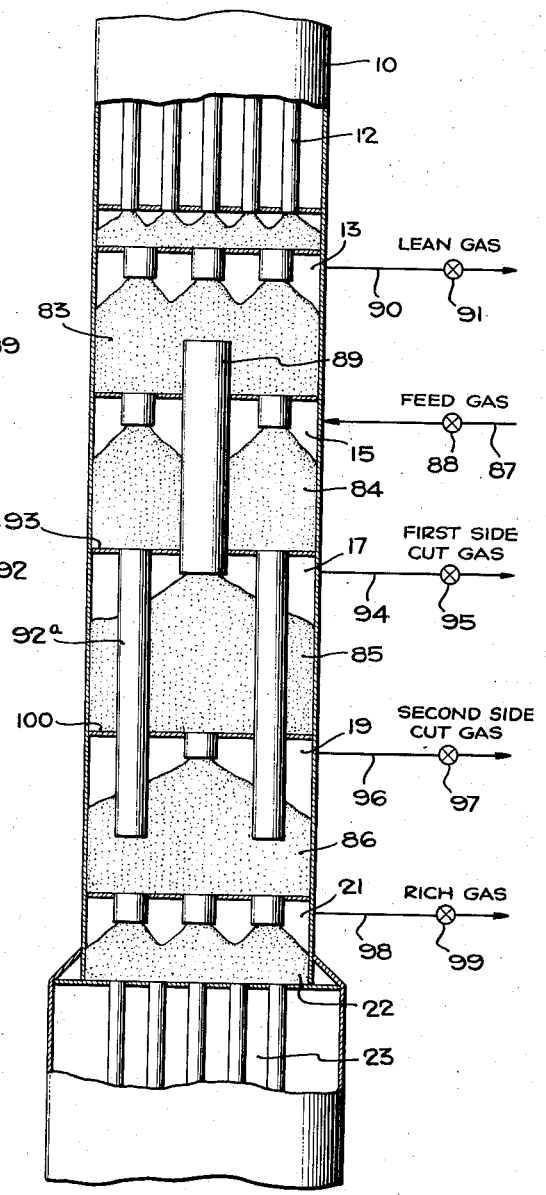

UNITED STATES PATENT OFFICE 2,575,520

ADSORPTION PROCESS

Clyde H. O. Berg, Long Beach, Calif., assignor to Union Oil Company of California, Los Angeles, Calif., a corporation of California Application June 19, 1947, Serial No. 755,754

16 Claims. (Cl. 183—4.2)

This invention relates to the separation of gaseous mixtures into a plurality of fractions or a plurality of individual constituents thereof by continuous selective adsorption on solid granular adsorbents and is particularly directed to the separation of such gaseous mixtures into at least four product fractions. My invention further relates to a process and apparatus for the separation of low molecular weight hydrocarbon gaseous mixtures containing hydrogen into at least four substantially pure fractions thereof by continuous selective adsorption on granular charcoal. This is a continuation-in-part of my copending application Serial No. 618,346, now issued as U. S. Patent 2,519,873.

Gaseous mixtures containing these valuable components are produced in large quantities in many processes, for example, in the thermal or catalytic cracking of hydrocarbon fractions for the production of high grade fuels or the cracking of lower molecular weight hydrocarbon fractions for the production of unsaturated hydrocarbons specifically for use in synthetic organic chemical manufacture. In such processes the hydrocarbon feed stock, such as, for example, gas oil, or the like is subjected to pyrolysis or cracking by treatment at elevated temperatures at which decomposition is caused, or by contacting with a catalyst at somewhat more moderate temperatures. Following the cracking operation the products thereof are cooled to near atmospheric temperatures causing the formation of a liquid condensate containing the normally liquid hydrocarbons of the product together with some dissolved normally gaseous hydrocarbons and a gaseous phase consisting predominantly of the normally gaseous hydrocarbons and saturated with a certain amount of the normally liquid hydrocarbons. The gas phase thus produced comprises a gaseous mixture containing substantial quantities of hydrogen together with low molecular weight saturated and unsaturated hydrocarbons having less than about five carbon atoms per molecule and which are especially valuable in chemical synthesis reactions.

The separation of such a light gaseous mixture into its constituent parts by the process of selective adsorption offers many advantages over the conventional separation processes of distillation, extraction, etc. In applying the processes of distillation or extraction to the separation of gaseous mixtures containing constituents of relatively low molecular weight, elevated pressures are required together with abnormally low temperatures to condense the gas into a liquid so that it may be separated by these processes. For example, in the preparation of pure ethylene by fractional distillation of ethylene-bearing stocks, a fractionator pressure of 385 pounds per square inch and a reflux temperature of —5° F. are required. In the preparation of pure methane by a similar process a pressure between 500 and 600 pounds per square inch and a reflux temperature of —150° F. are required. The compression and refrigeration of light gaseous mixtures to permit separation by distillation or extraction are expensive operations and consequently large quantities of gaseous mixtures containing these and other light compounds are often wasted rather than to perform expensive recovery operations.

The conventional process of gas absorption has disadvantages which often render it inapplicable to the separation of light gaseous mixtures because generally the gases of low molecular weight are less soluble in the absorbing medium used in adsorbing compounds of the same class having higher molecular weights. Thus, high pressures of operation are also required in absorption processes in order to obtain an appreciable concentration of the light gaseous compound in the absorbing medium and to avoid circulation of large quantities of the absorbing medium through the system.

It has been found that such mixtures of cracked gases containing substantial quantities of hydrogen and unsaturated compounds may be more conveniently and more efficiently separated by the application of a modification of the process of selective adsorption on a solid granular adsorbent as hereinafter more clearly described.

In general, the process of separating gaseous mixtures by selective adsorption on granular adsorbents, such as for example, activated charcoal, activated alumina, or silica gel, or the like, involves the steps of contacting countercurrently the gaseous mixture with the adsorbent, preferably in a moving bed. In a moving bed operation the adsorbent, upon which certain of the gaseous components have been adsorbed, flows from the adsorption zone through one or more rectification zones and into a stripping or desorption zone wherein the adsorbed components are caused to be desorbed from the adsorbent by the application of heat and a stripping gas, such as steam, for example, to form a lean adsorbent. The lean adsorbent is subsequently cooled prior to repassage through the adsorption section.

Solid adsorbents generally adsorb certain gases more strongly than others and the process of selective adsorption is based upon this phenomenon. In the case of charcoal as the adsorbent, those hydrocarbon gases having the higher boiling point or higher molecular weight are adsorbed preferentially to those having the lower boiling point or molecular weight. In the nonhydrocarbon gases there appears to be a correlation of adsorption with the critical temperature of the gas, those gases having low critical temperatures like hydrogen and helium being substantially unadsorbed.

More specifically the selective adsorption process involves the maintenance of a continuous flow of a solid granular adsorbent downwardly by gravity through a selective adsorption column. The adsorption column may consist of a hopper or reservoir for the adsorbent positioned in the upper portion of the adsorption column, a cooling zone positioned directly beneath, and may have one or more adsorption zones positioned directly beneath the cooling zone. One or more rectification zones are located below the adsorption zones and a desorption zone which comprises a steaming zone and a heating zone, is positioned in the lower portion of the adsorption column. The selective adsorption apparatus is provided with means for lifting the adsorbent which flows from the lower portion of the adsorption column to a separator positioned above the upper end of the adsorption column from which the adsorbent flows by gravity into the adsorbent hopper previously mentioned. Means are also provided in the lower portion of the adsorption column for controlling the rate at which the adsorbent is circulated through the system.

It is the purpose herein to disclose certain improvements in the selective adsorption process which permit the application of that process to the separation of normally gaseous mixtures into at least four fractions thereof having substantially any desired degree of purity. It is further proposed to disclose the improvements in the selective adsorption process making it particularly adaptable to the processing of hydrogen-containing low molecular weight hydrocarbon mixtures for the production of a plurality of substantially pure fractions together with a stream of very high purity hydrogen. Further, the improved selective adsorption apparatus, according to my invention, permits the production of at least two side cut or heart cut gases containing constituents of intermediate adsorbability both above and below the feed gas inlet. It is possible by application of modifications of my invention to permit the production of product gas fractions of very high purity by employing a rectification of each of the plurality of product gases within the adsorption bed.

It is a principal object of my invention to provide an improved selective adsorption process for the separation of normally gaseous mixtures into a plurality of product gas fractions of high purity.

It is a further object of my invention to provide in the selective adsorption process certain improvements which permit the production of at least four product gases of high purity from a given gaseous mixture.

It is an additional object to provide an improved selective adsorption process which is particularly adapted to the separation of individual constituents in a state of high purity from hydrogen containing low molecular weight normally gaseous mixtures which are produced in modern petroleum refining operations.

It is a correlative object of my invention to provide an improved selective adsorption apparatus adapted to accomplish the above-mentioned objects.

Other objects and advantages of my invention will become apparent to those skilled in the art as the description thereof proceeds.

The above contemplated objects of my invention are accomplished by providing in the selective adsorption process as more fully described hereinafter, a selective adsorption column adapted to separate a gaseous mixture into at least four product gas fractions thereof. These product gas fractions may be produced with any given degree of purity depending upon the desired composition by a modification of the operation or the apparatus. I have found it possible to separate a gaseous mixture into at least four fractions of high purity by producing a lean gas product containing the less readily adsorbable constituents of the gaseous mixture from the absorption column above the feed gas inlet point and by subjecting the rich adsorbent formed from contact of the adsorbent with the feed gas to a series of carefully controlled rectifications. At least three product gases of high purity may be produced from the selective adsorption column below the feed gas inlet. It is further possible to produce more than four fractions of the gaseous mixture to be separated in such cases where the composition of the feed gas warrants production of such a plurality of fractions merely by inserting a larger number of rectification or adsorption zones as further described hereinafter. It is possible, however, by means herein described to produce at least four fractions of high purity and considerably more than four fractions which contain one or more individual constituents of the gaseous mixture. My invention, in brief, comprises a process and apparatus for the separation of gaseous mixtures into at least four fractions of high purity by continuous selective adsorption.

In one modification of my invention, the solid granular adsorbent such as for example silica gel, activated alumina, activated bauxite, activated charcoal, etc., flows downwardly by gravity through a selective adsorption column which is provided with a cooling zone and an adsorption zone in the upper portion of the selective adsorption column together with a number of rectification zones at successively lower intervals below the adsorption zone.

Each of the previously mentioned zones are separated from one another by engaging and disengaging zones which permit the introduction or removal of gases therethrough from or into the adsorbent bed within the adsorption column. In general these engaging and disengaging zones are similar in that they comprise a horizontal plate which fills the entire cross sectional area of the adsorption column. A series of tubes are arranged on the horizontal plate in a regular geometrical pattern and are open at the upper and lower ends so as to permit the continuous downward flow of adsorbent therethrough. The angle of repose of a solid granular adsorbent flowing downwardly through the tubes of such a disengaging zone is such that a large free space is formed below the horizontal plate previously mentioned and above the upper surface of the adsorbent flowing from the lower open end of the tubes. A gas may be introduced into the free space thus formed and will flow into the adsorbent bed through interstices present therein. A gas may be disengaged from the adsorbent bed and removed from the adsorption column in reverse manner.

The process and apparatus of my invention may be more clearly understood by reference to the accompanying drawings in which Figure 1 is a general elevation view in partial cross section of the improved selective adsorption apparatus adapted to the production of at least four fractions of a given gaseous mixture, Figure 2 is a detailed elevation in cross section of the adsorption and rectification zones of one modification of the selective adsorption apparatus, and Figure 3 is a detailed elevation in cross section of another modification of the selective adsorption apparatus according to my invention.

For purposes of greater clarity the process and apparatus of my invention will be described as employing activated charcoal as the solid granular adsorbent applied to separation of a gaseous mixture which comprises normally gaseous low molecular weight hydrocarbons having four carbon atoms per molecule or less. The particular adsorbent and the particular gaseous mixture described is not to be taken as limiting my invention but only as descriptive of one modification thereof.

Referring particularly to Figures 1 and 2, selective adsorption column 10 is provided at successively lower intervals with hopper 11, cooling zone 12, lean gas disengaging zone 13, adsorption zone 83, feed gas engaging zone 15, primary rectification zone 84, first side cut gas disengaging zone 17, secondary rectification zone 85, second side cut gas disengaging zone 19, tertiary rectification zone 86, rich gas disengaging zone 21, steaming zone 22, heating zone 23, charcoal feeder zone 24 and bottom zone 25. Steaming zone 22 and heating zone 23 comprise a desorption zone which functions to remove from the adsorbent the more readily adsorbable constituents adsorbed thereon. The charcoal discharged into the bottom zone 25 flows downwardly through sealing leg zone 26, through charcoal flow control valve 27 and into charcoal transfer line 28. The charcoal flowing through transfer line 28 is introduced into lift line 29 wherein it is mixed to form suspension with lean lift gas flowing through line 30. The charcoal-lift gas suspension flows upwardly through lift line 29 under pressure exerted by lift gas blower 31 controlled by valve 32 and is introduced into impactless separator 33. Within impactless separator 33 the charcoal suspension is broken and the separated charcoal together with the lift gas flows downwardly through transfer line 34 and is introduced into hopper 11 of selective adsorption column 10. The lift gas is removed from the upper portion of selective adsorption column 10 by means of line 35 which returns the lift gas to blower 31 for re-use in the lift gas cycle. The charcoal thus introduced into hopper 11 passes downwardly by gravity through the tubes of cooling zone 12 wherein the lean charcoal, heated to an elevated temperature to effect desorption of the more readily adsorbable constituents in heating zone 23, is cooled to a temperature of between about 80° F. and 100° F. by means of cooling water or other coolant circulated on the outside of the tubes. The cool lean charcoal thus formed flows downwardly by gravity successively through the zones previously mentioned and is discharged into lift line 29 for recirculation.

Level control 80 shown in Figure 1 comprises a receptacle such as a funnel placed within the adsorbent bed and positioned so that the adsorbent flows downwardly through the funnel. The funnel is supported within the moving bed by a suspension arm which is attached at right angles to a torsion tube assembly. This assembly consists of a hollow torsional tube and an inner transmission shaft positioned within the torsion tube and affixed to the torsion tube at the end which joins the suspension arm. The other end of the torsion tube is fixed in position while the transmission shaft is free to rotate through the same arc as the suspension arm when the funnel moves. The transmission shaft turns through an arc against the restoring torque of the torque tube in accordance with the position of the funnel which changes with the level of adsorbent in bottom zone 25. The transmission shaft, in turning opens and closes an air valve which controls the air pressure at pneumatically operated adsorbent valve 27. Thus, as the level of adsorbent rises, the funnel supports a greater weight causing the transmission shaft to turn thereby changing the air pressure at the adsorbent valve in such a manner as will cause the discharge from bottom zone 25 of larger quantities of adsorbent. This causes the adsorbent level to drop. In the manner hereinabove described, level control 80 controls the adsorbent level in bottom zone 25.

A gaseous mixture to be separated which comprises $C_1$, $C_2$, $C_3$, and $C_4$ hydrocarbons, for example, is introduced by means of line 87 controlled by valve 88 actuated by flow controller 39 into feed gas engaging zone 15 wherein it engages the charcoal flowing downwardly through feed gas engaging zone 15 and flows upwardly through adsorption zone 83 countercurrent to the downwardly flowing charcoal. The $C_3$ and $C_4$ hydrocarbon constituents of the gaseous mixture are adsorbed in adsorption zone 83 to form a rich charcoal and a substantially unadsorbed gas containing $C_1$ and $C_2$ hydrocarbons. A portion of the gas flowing upwardly through adsorption zone 83 disengages itself from the charcoal in lean gas disengaging zone 13 and is removed therefrom by means of line 90 controlled by valve 91 and is introduced by means of line 49 into header 50 which conducts the lean gas into separator 51. A substantially complete removal of fine granulated charcoal suspended in the lean gas withdrawn from disengaging zone 13 is effected in separator 51 and the separated fine charcoal is removed therefrom by means of line 52 controlled by valve 53 and is disposed of. The remaining portion of gas flowing upwardly through adsorption zone 83 passes upwardly through lean gas product disengaging zone 13, passes upwardly through the tubes and countercurrent to the charcoal flowing downwardly through cooling zone 12, passes upwardly through the charcoal present in hopper 11 and enters the free space in the uppermost portion of selective adsorption column 10. During the passage of this portion of lean gas upwardly through cooling zone 12 the dual purpose is served in that traces of moisture are removed and the charcoal flowing therethrough is saturated with the lean gas product. Removal of the moisture from charcoal is important in that accumulation of excessive moisture on the charcoal deleteriously affects the flow characteristics and adsorptive capacity thereof. Furthermore, saturation of the lean charcoal flowing through cooling zone 12 dissipates the heat of adsorption formed from saturating the charcoal with lean gas which subsequently lowers the effective adsorption and rectification temperatures present in the adsorption and rectification zones below. The gas which flows upwardly through cooling zone 12 is removed from the upper portion of selective adsorption column 10 and enters the lift gas return line 35 wherein it accumulates. In order to remove accumulations of lean gas in the lift gas cycle, line 54 controlled by valve 55 is provided to remove an amount of gas from lift gas return line 35 equivalent to the amount which flows upwardly through cooling zone 12. The gas thus removed is conveyed through line 56 and joined with the lean gas removed from lean gas disengaging zone 13 in header 50 whereby the total lean gas is introduced into separator 51 as previously described. The lean gas product is removed from separator 51 by means of line 57 and is sent to storage, further processing, if required, or to use in a given process.

Tube 89, shown in Figure 2 has a single tube for purposes of clear description but comprising in an actual apparatus a series of parallel tubes having extremities at the same upper and lower levels as tube 89, is provided to remove charcoal from the upper portion of adsorption zone 83 and to conduct this charcoal downwardly through and independent of primary rectification zone 84 and to introduce the charcoal thus withdrawn directly into secondary rectification zone 85. The upper extremity of tube 89 is positioned at a level within adsorption zone 83 so that the charcoal present at this level contains substantially no adsorbed $C_3$ or $C_4$ hydrocarbons but which is substantially saturated with adsorbed $C_1$ and $C_2$ hydrocarbons. The gas present at this level also consists essentially of $C_1$ and $C_2$ hydrocarbons and in passing upwardly through charcoal present in adsorption zone 83 above the upper extremity of tube 89 is contacted with additional quantities of cool lean adsorbent so as to substantially completely adsorb the $C_2$ hydrocarbons together with a small amount of $C_1$ hydrocarbon present in the gas at this level. The unadsorbed gas thus formed comprises substantially pure methane and a portion of this gas is disengaged from the charcoal by means of lean gas disengaging zone 13 and is withdrawn therefrom as previously described.

The charcoal containing adsorbed $C_2$ and $C_1$ hydrocarbons, but containing substantially no adsorbed $C_3$ and $C_4$ hydrocarbons, flows downwardly through tube 89 from adsorption zone 83 and is discharged directly into secondary rectification zone 85. The rich charcoal formed in the lower portion of adsorption zone 83 just above feed gas engaging zone 15 and which contains adsorbed $C_1$, $C_2$, $C_3$, and $C_4$ hydrocarbons flows downwardly into primary rectification zone 84. The rich charcoal is herein contacted with a reflux gas containing $C_2$ hydrocarbons in substantially pure form thereby being preferentially adsorbed by the rich charcoal and causing a preferential desorption of a small amount of adsorbed $C_1$ hydrocarbon present on the charcoal to form an enriched charcoal. The $C_1$ hydrocarbon thus desorbed passes upwardly through primary rectification zone 84 and re-enters adsorption zone 83. The enriched charcoal flows downwardly through first side cut gas disengaging zone 17, passes downwardly through tubes 92 extending downwardly from tray 93 well into the central portion of the enriched charcoal bed present within secondary rectification zone 85. A portion of a reflux gas containing substantially pure $C_2$ hydrocarbons passes upwardly countercurrently to the downwardly flowing enriched adsorbent in tube 89 therein causing a substantially complete preferential desorption of $C_1$ hydrocarbon adsorbed on the charcoal flowing therethrough. The combination of reflux employed in tube 89 and in the lower portion of primary rectification zone 84 serves to insure the substantially complete desorption of constituents less readily adsorbable than those constituents desired in the first side cut gas product. In this case $C_2$ hydrocarbons are desired in the first side cut gas product and $C_1$ hydrocarbon is therefore preferentially desorbed from the enriched charcoal prior to introduction of the enriched charcoal into secondary rectification zone 85.

The enriched charcoal present in secondary rectification zone 85 and containing adsorbed $C_2$, $C_3$, and $C_4$ hydrocarbons is contacted therein with a reflux gas containing $C_3$ and $C_4$ hydrocarbons thereby forming a partially rectified charcoal and causing the substantially complete desorption from the enriched charcoal of $C_2$ hydrocarbons adsorbed thereon. The $C_2$ hydrocarbons thus desorbed flow upwardly, disengaging from the charcoal, and entering first side cut gas disengaging zone 17. A portion of the thus desorbed gas which consists of substantially pure $C_2$ hydrocarbons is employed as reflux in the manner previously described and the remaining portion is removed as a first side cut gas product from disengaging zone 17 by means of line 94 controlled by valve 95 and is introduced through line 42 into separator 43. Separator 43 functions to remove from the first side cut gas product traces of finely granulated charcoal which settle to the bottom thereof. These charcoal fines are removed from separator 43 by means of line 44 controlled by valve 45 and are disposed of in any convenient manner. The first side cut gas product is removed from separator 43 by means of line 46 and sent to further processing, if desired. The first side cut gas product thus produced consists of substantially $C_2$ and contains substantially no $C_1$ or $C_3$ hydrocarbons because of the fact that the $C_1$ hydrocarbon is preferentially desorbed from the charcoal prior to entry into secondary rectification zone 85 and the $C_3$ hydrocarbons present on the enriched charcoal introduced into secondary rectification zone 85 from primary rectification zone 84 is introduced into secondary rectification zone 85 at a level well below that at which first side cut gas product is removed. Thus the $C_3$ and higher molecular weight hydrocarbons are conducted past the point of removal of first side cut gas product in such a manner so that there is no possibility of contamination of this side cut gas product by higher molecular weight hydrocarbons.

The partially rectified charcoal formed as previously described in secondary rectification zone 85 flows downwardly through second side cut gas disengaging zone 19 and is introduced into tertiary rectification zone 86. Herein the partially rectified charcoal is subjected to the action of a reflux gas which contains substantially pure $C_4$ hydrocarbons thereby causing a preferential desorption from the partially rectified charcoal of $C_3$ hydrocarbons adsorbed thereon. The $C_3$ hydrocarbons thus desorbed flow upwardly countercurrent to the downwardly flowing charcoal and a portion of the $C_3$ hydrocarbons thus desorbed are employed as reflux in secondary rectification zone 85 as previously described to effect desorption therein of adsorbed $C_2$ hydrocarbons. The remaining portion of the desorbed $C_3$ hydrocarbons together with some $C_4$ hydrocarbons are removed from second side cut gas disengaging zone 19 by means of line 96 controlled by valve 97 which is actuated in turn by recording thermometer recorder controller 60 and flows through line 61 and is introduced into separator 62. Within separator 62 the gas thus withdrawn is separated from the suspended charcoal fines which flow to the bottom and are removed by means of line 63 controlled by valve 64 and are disposed of. The gas thus purified is removed from separator 62 by means of line 65 as a second side cut gas product consisting essentially of $C_3$ hydrocarbons but containing a small amount of $C_4$ hydrocarbons.

The rectified charcoal formed in tertiary rectification zone 86 and containing adsorbed thereon substantially pure $C_4$ hydrocarbons flows downwardly through rich gas disengaging zone 21 into steaming zone 22. Herein the rectified charcoal is subjected to the action of a countercurrent flow of a stripping gas such as for example steam at low temperature and in the absence of indirect heating and effects the desorption of the major portion of $C_4$ hydrocarbons adsorbed thereon. A portion of the $C_4$ hydrocarbons thus desorbed is employed as reflux as previously described in tertiary rectification zone 86 and the remainder is removed from rich gas disengaging zone 21 together with some of the stripping gas by means of line 98 controlled by valve 99 actuated in turn by temperature recorder controller 68. The rich gas thus removed is conveyed by means of line 69 and introduced into rich gas cooler 70 wherein the rich gas product is cooled and quantities of stripping gas are condensed. The cool gas and condensate are removed from rich gas cooler 70 by means of line 71 and are introduced into separator 72 wherein a separation is made between the cool rich gas product and the condensate. The condensate is removed from separator 72 by means of line 73 controlled by valve 74 which in turn is actuated by level controller 75. The condensate thus removed may be re-evaporated and returned as steam to the lower portion of adsorption column and introduced by means of line 76 controlled by valve 77 into bottom zone 25. The rich gas is removed from separator 72 by means of line 78 as a rich gas product consisting essentially of $C_4$ hydrocarbons and is sent to storage for further processing not shown.

Within steaming zone 22 wherein desorption of the major portion of adsorbed hydrocarbons from the charcoal occurs, a preferential adsorption of the stripping gas simultaneously takes place and the partially stripped adsorbent flows downwardly from steaming zone 22 through the tubes of heating zone 23. Herein the partially stripped charcoal is subjected to indirect heating and further contact with quantities of the stripping gas which serves to substantially completely remove the adsorbed hydrocarbons from the partially stripped adsorbent to form a hot lean adsorbent. Should the lean adsorbent be heated to a sufficiently high temperature in the lower portion of heating zone 23 a substantially complete desorption of the adsorbed stripping gas is also effected and the desorbed stripping gas flows upwardly through the tubes of heating zone 23 to re-enter steaming zone 22 wherein it again is adsorbed in the desorption of hydrocarbons. In this manner an internal recycle of stripping gas is maintained which permits the desorption from the charcoal of the major portion of adsorbed hydrocarbons at low temperature and in the absence of indirect heating and in this manner only very small amounts of make up stripping gas are required to be added.

The hot lean charcoal flows downwardly through heating zone 23 and through charcoal feeder zone 24 and drops into bottom zone 25 from whence it is removed by a sealing leg zone 26 and charcoal valve 27 and returns to the upper portion of selective adsorption column 10 as previously described. The hot lean charcoal flows downwardly through cooling zone 12 wherein the lean charcoal is cooled to a sufficiently low temperature, for example, between about 80° F. and 100° F. suitable for introduction in the adsorption zones directly below.

A small amount of stripping gas introduced into bottom zone 25, as previously described, flows downwardly through sealing leg zone 26 concurrently with the hot lean charcoal and enters charcoal valve 27 from whence it is removed by means of line 78 controlled by valve 79. This downflow of stripping gas provides an effective seal against the upflow of lean lift gas through transfer line 28 which would otherwise contaminate the rich gas product removed from steaming zone 22. This upflow of lean lift gas enters charcoal valve 27 and is removed therefrom together with the downflow of stripping gas by means of line 78 controlled by valve 79. Charcoal valve 27 is actuated by level controller 80 which operates to maintain sealing leg zone 26 full of charcoal so as to provide effective sealing of the bottom of selective adsorption column 10 against contamination of the rich gas product.

Temperature recorder controller 60 which actuates valve 59 in the control of the flow rate of removal of second side cut gas product is in turn actuated by a thermocouple point 81 which is positioned at a point at which a sharp change in charcoal temperature break occurs within secondary rectification zone 85. The temperature of the charcoal below thermocouple point 81 may be as much as 40° F. to 60° F. higher than the temperature of the charcoal entering secondary rectification zone 85. This is due to the fact that adsorption of gases on solid adsorbents is an exothermic phenomenon coupled with the fact that higher molecular weight hydrocarbons are more readily adsorbable than lower molecular hydrocarbons. A similar means of control over the flow rate of rich gas removal from rich gas disengaging zone 21 is employed. Temperature recorder controller 68 which actuates valve 67 as previously described is in turn actuated by thermocouple point 82 positioned within tertiary rectification zone 86. In both cases a rise in temperature indicated by their thermocouple point indicates an excessive amount of reflux present below the thermocouple point and the individual temperature recorder controller acts to increase the opening of the valve it actuates so as to remove higher molecular weight constituents at a greater rate and thus decrease somewhat the quantity of reflux employed. Thermocouples 81 and 82 may be replaced by other means of temperature indication such as gas thermometers, mercury thermometers, and others, however, the employment of thermocouples and particularly iron-constantan have been found particularly adaptable to the control of the improved selective adsorption process according to my invention.

The modification of the apparatus of my invention as just described permits the separation of a feed gas into four fractions thereof and may, if desired, be separated into more than four fractions by the addition of further rectification zones and further product gas disengaging zones similar to those described. It should be noted in the case of the separation described in conjunction with Figure 2 that the second side cut gas product is contaminated with $C_4$ hydrocarbons whereas the other three products are substantially pure constituents. If more than four fractions are desired these further intermediate fractions will also be contaminated with certain amounts of higher or lower molecular weight hydrocarbons than the hydrocarbons desired. It should also be understood that the gaseous mixture separated by the apparatus described in Figure 2 may as conveniently have been a gaseous mixture containing hydrogen, $C_1$, $C_2$, and $C_3$ hydrocarbons or a gaseous mixture comprising $C_2$, $C_3$, $C_4$, and higher molecular weight hydrocarbons. The apparatus is also applicable to the separation of nonhydrocarbon gases wherein the lean gas product may comprise nitrogen, oxygen, carbon monoxide, etc.

Figure 3 shows another modification of the separation zone of the improved selective adsorption apparatus according to my invention. This modification of the apparatus permits the separation of a gaseous mixture similar to that described in conjunction with Figure 2 into at least four fractions including four substantially completely pure fractions of the gaseous mixture. Selective adsorption column 10 is again provided with cooling zone 12, lean gas disengaging zone 13, adsorption zone 83, feed gas engaging zone 15, primary rectification zone 84, first side cut gas disengaging zone 17, secondary rectification zone 85, second side cut gas disengaging zone 19, tertiary rectification zone 86, rich gas disengaging zone 21, steaming zone 22, and heating zone 23 as in Figure 2. Tube 89 is also provided and extends from the central portion of adsorption zone 83, downwardly through primary rectification zone 84, through tray 93, and extends a short distance into secondary rectification zone 85 and is entirely analogous to tube 89 described in Figure 2. Tray 93 is equipped with tubes 92a which, as differentiated from the modification shown in Figure 2, extend downwardly through secondary rectification zone 85 through tray 100 and extend downwardly into the central portion of charcoal bed present in tertiary rectification zone 86.

A feed gas containing hydrogen, $C_1$, $C_2$ and $C_3$ hydrocarbons is introduced by means of line 87 controlled by valve 88 into feed gas engaging zone 15 and flows upwardly through feed gas engaging zone 15 and upwardly through adsorption zone 83 countercurrent to the downwardly moving bed of cool lean charcoal. Below the level of the upper extremity of tube 89 the $C_2$ and $C_3$ hydrocarbons together with some $C_1$ hydrocarbon is adsorbed on the charcoal to form a rich charcoal and leaves as a substantially unadsorbed gas $C_1$ hydrocarbon together with hydrogen. The unadsorbed gas passes upwardly through the downwardly moving charcoal above the level of the upper extremity of tube 89 in which the $C_1$ hydrocarbon present in the unadsorbed gas is adsorbed forming a lean gas which comprises substantially pure hydrogen. A portion of this hydrogen flows upwardly through lean gas disengaging zone 13 and passes upwardly through the tubes of cooling zone 12 while the remaining portion of the hydrogen is removed from lean gas disengaging zone 13 by means of line 90 controlled by valve 91 and is sent as the lean gas product to further processing or storage, not shown.

The charcoal flowing downwardly through tube 89 contains substantially no adsorbed $C_2$ or $C_3$ hydrocarbons but is an enriched charcoal containing adsorbed $C_1$ hydrocarbon together with hydrogen and is introduced directly into secondary rectification zone 85. The enriched charcoal containing adsorbed $C_2$ and $C_3$ hydrocarbons formed in the lower portion of adsorption zone 83 flows downwardly through feed gas engaging zone 15 and is discharged into primary rectification zone 84. The enriched charcoal in primary rectification zone 84 is contacted with a reflux gas containing substantially pure $C_3$ hydrocarbons serving thereby to desorb any $C_1$ hydrocarbon adsorbed thereon. The charcoal introduced by means of tube 89 into secondary rectification zone 85 contains substantially no $C_2$ and higher molecular weight hydrocarbons but only adsorbed $C_1$ hydrocarbon. This charcoal is contacted in secondary rectification zone 85 with a reflux gas which contains substantially pure $C_2$ hydrocarbons thereby effecting a substantially complete desorption from the enriched charcoal of $C_1$ hydrocarbon adsorbed thereon thus forming a partially rectified charcoal. A portion of the $C_1$ hydrocarbon thus desorbed passes upwardly through tube 89 serving as reflux therein to effect desorption of adsorbed hydrogen from the charcoal passing therethrough and the remaining portion of $C_1$ hydrocarbon is removed from first side cut gas disengaging zone 17 by means of line 94 controlled by valve 95 as a first side cut gas product consisting of substantially pure $C_1$ hydrocarbon. The partially rectified charcoal formed in secondary rectification zone 85 flows downwardly and is introduced into the upper portion of tertiary rectification zone 86.

The charcoal introduced by means of tubes 92a into tertiary rectification zone 86 is substantially free of hydrocarbons having lower molecular weights than the $C_2$ hydrocarbons. This partially rectified charcoal containing adsorbed $C_2$ and $C_3$ hydrocarbons is contacted with a reflux gas comprising substantially pure $C_3$ hydrocarbons effecting a substantially complete desorption of $C_2$ hydrocarbons from the partially rectified charcoal to form a rectified charcoal. A portion of the $C_2$ hydrocarbons thus desorbed is employed as reflux in secondary rectification zone 85 and the remaining portion is removed as a second side cut gas product by means of line 96 controlled by valve 97 and is sent as substantially pure $C_2$ hydrocarbons to further processing or storage, not shown. The second side cut gas product is not contaminated with $C_1$ or $C_3$ hydrocarbons because the $C_1$ hydrocarbon is efficiently desorbed from the charcoal in secondary rectification zone 85 and the charcoal containing adsorbed $C_3$ hydrocarbons is introduced into the central portion of tertiary rectification zone 86 by means of tubes 92a in such a manner that the $C_3$ hydrocarbons are adsorbed but they are able to pass upwardly as far as the point at which the second side cut gas product is removed.

The rectified charcoal containing substantially pure adsorbed $C_3$ hydrocarbons formed in tertiary rectification zone 86 passes downwardly into steaming zone 22 wherein it is subjected to the action of a stripping gas such as for example steam at low temperature and in the absence of indirect heating so as to desorb the major portion of $C_3$ hydrocarbons adsorbed thereon. As in the case of the separation described in connection with Figure 2 the constituents thus desorbed in steaming zone 22 comprise a rich gas, a portion of which is employed as reflux and the remaining portion of which is removed as a rich gas product from rich gas disengaging zone 21 by means of line 98 controlled by valve 99. The partially stripped adsorbent thus formed is substantially completely stripped as previously described by the action of indirect heating and further quantities of a stripping gas in heating zone 23.

The four product gases comprising the lean gas, the first side cut gas, the second side cut gas and the rich gas products, are produced containing virtually no contamination from constituents of higher or lower molecular weight. This has been accomplished as above described by careful control of reflux and routing of the adsorbent downwardly through the adsorption and rectification zones previously described.

The degree of separation which may be accomplished by the process and apparatus of my invention as previously described, may be illustrated by reference to the following two examples:

Example I

The present example describes the separation of a gaseous mixture flowing at a rate of 15,600 MSCF/SD (1 MSCF/SD=1,000 standard cubic feet per stream day) in an apparatus similar to that shown in Figure 1 and Figure 2.

The gaseous mixture has the following composition:

| Constituent | Volume Per Cent |
| --- | --- |
| Hydrogen | 14.6 |
| Methane | 25.2 |
| Ethylene | 26.0 |
| Ethane | 19.7 |
| Propylene | 13.5 |
| Propane | 1.0 |
| $C_4^+$ | Trace |
| | 100.0 |

The selective adsorption column required to effect this separation is 11.0 feet in diameter and approximately 120 feet high and employs activated charcoal as the adsorbent circulated through the selective adsorption column at the rate of 165 tons per hour.

The separation is carried out at a pressure of about 200 pounds per square inch gauge.

The following table of product gas analyses and product flow rates indicates the degree of separation obtained:

| Constituent | Lean Gas Product | First Side Cut Gas Product | Second Side Cut Gas Product | Rich Gas Product |
| --- | --- | --- | --- | --- |
| Hydrogen | 97.5 | 3.0 | | |
| Methane | 2.5 | 96.5 | 0.2 | |
| Ethylene | | 0.3 | 47.2 | 0.4 |
| Ethane | | 0.2 | 35.0 | 0.4 |
| Propylene | | | 15.6 | 92.4 |
| Propane | | | 1.1 | 6.7 |
| $C_4^+$ | | | | 0.1 |
| Totals | 100.0 | 100.0 | 100.0 | 100.0 |
| Flow Rate MSCF/SD | 2,220 | 3,980 | 6,960 | 2,440 |

Example II

A series of four substantially pure products may be prepared by employing a second modification of the apparatus according to my invention as depicted in Figure 3. In employing this apparatus to separation of a gaseous mixture having an analysis similar to the analysis of the feed gas given in Example I and with a similar charcoal circulation rate and at 200 pounds per square inch pressure, four gas products having the following analysis were produced:

| Constituent | Lean Gas Product | First Side Cut Gas Product | Second Side Cut Gas Product | Rich Gas Product |
| --- | --- | --- | --- | --- |
| Hydrogen | 97.5 | 1.5 | | |
| Methane | 2.5 | 98.0 | 0.2 | |
| Ethylene | | 0.3 | 56.6 | 0.1 |
| Ethane | | 0.2 | 43.1 | 0.1 |
| Propylene | | | 0.1 | 92.9 |
| Propane | | | | 6.8 |
| $C_4^+$ | | | | 0.1 |
| Totals | 100.0 | 100.0 | 100.0 | 100.0 |
| Flow Rate MSCF/SD | 2,250 | 3,920 | 7,350 | 2,040 |

The decided advantage of employing the modification of apparatus shown in Figure 3 in the separation of such gaseous mixture is at once apparent upon comparison of the product gas analyses with that obtained using the Figure 2 modification.

The charcoal employed in the above process is preferably granular, about 10 to 14 mesh although granules as large as about four mesh and as small as about 100 or smaller may be employed in specific instances. The term charcoal used in the foregoing description is meant to include any animal, vegetable, or mineral carbon, the preferable form being an activated vegetable charcoal such as that prepared from coconut hulls or fruit pits.

The length of life of the charcoal, that is, the duration of time in which the adsorbent exhibits its normal adsorption capacity, depends largely upon the nature of the components present in the gaseous mixture introduced into the selective adsorber. In normal operation of the selective adsorber, a small amount, that is, between about 5 and 15 weight per cent of the charcoal flow rate through the selective adsorber, is removed and subjected to a high temperature reactivation. Such an operation is generally conducted in a tubular heater connected in parallel with the charcoal adsorber; however, such a tubular heater is not shown in the accompanying drawings.

It is to be understood, however, that the specific separation and adsorbent used herein with the description of the accompanying drawing have been used only for purposes of permitting greater clarity in the description of the drawing and that my invention is applicable to advantage in the separation of many other gaseous mixtures which are required to be separated into a plurality of fractions comprising at least four product gases.

A modification exists in the manner in which the granular adsorbent is conveyed from the bottom of the selective adsorber to the top thereof in which bucket elevators are applicable. In some instances such as for example at the lower pressures the use of elevators to transport the adsorbent are of advantage but in general the use of the gas lift system shown in the drawing described in the description thereof is to be preferred.

In addition, and especially with reference to the selective adsorber previously described, I do not wish to be limited by the particular adsorbent named in the description because the apparatus of my invention performs equally as well with all other solid granular adsorbents such as for example silica gel, activated alumina, various adsorbent formed from iron and chromium oxides, and others, as it does with charcoal, and my invention is therefore independent of the type or character of the adsorbent used.

Having described and illustrated my invention and realizing that many modifications thereof will occur to those skilled in the art without departing from the spirit and scope of the following claims, I claim:

1. A process for the continuous separation of normally gaseous mixtures containing constituents of varying degrees of adsorbability into at least four fractions which comprises passing a bed of solid granular adsorbent downwardly by gravity successively through a cooling zone, an adsorption zone, a primary rectification zone, a secondary rectification zone, a tertiary rectification zone and a desorption zone, introducing said gaseous mixture into the lower portion of said adsorption zone thereby adsorbing more readily adsorbable constituents from said gaseous mixture to form a rich adsorbent and a substantially unadsorbed gas containing less readily adsorbable constituents, removing said unadsorbed gas from said adsorption zone as a lean gas product, passing said rich adsorbent from the lower portion of said adsorption zone into the upper portion of said primary rectification zone, passing a portion of enriched adsorbent from the central portion of said adsorption zone through but independent of said primary rectification zone into the upper portion of said secondary rectification zone, passing adsorbent from the lower portion of said primary rectification zone into the central portion of said secondary rectification zone, contacting the combined adsorbent present in the lower portion of said secondary rectification zone with a reflux gas containing more readily adsorbable constituents thereby desorbing from said enriched adsorbent a gas containing constituents of intermediate adsorbability and forming a partially rectified adsorbent, introducing a portion of said desorbed gas into said primary rectification zone to serve as reflux therein, removing the remaining portion of the thus desorbed gas from said secondary rectification zone as a first side cut gas product, passing said partially rectified adsorbent from said secondary rectification zone into said tertiary rectification zone, contacting the partially rectified adsorbent in said tertiary rectification zone with a reflux gas containing the most readily adsorbable constituents thereby desorbing from said partially rectified adsorbent a gas containing constituents more readily adsorbable than those present in first side cut gas product to form a rectified adsorbent, introducing a portion of the thus desorbed gas containing more readily adsorbable constituents into said secondary rectification zone to serve therein as reflux, removing the remaining portion of the thus desorbed gas from said tertiary rectification zone as a second side cut gas product, desorbing from said rectified adsorbent in said desorption zone the most readily adsorbable constituents adsorbed thereon to form a lean adsorbent, returning a portion of the thus desorbed gas to said tertiary rectification zone to serve therein as reflux, removing the remaining portion of the thus desorbed gas from said desorption zone as a rich gas product, removing the lean adsorbent thus formed from said desorption zone, and returning the thus removed adsorbent to said cooling zone.

2. A process for the continuous separation of normally gaseous mixtures containing constituents of varying degrees of adsorbability into at least four fractions which comprises passing a bed of solid granular adsorbent downwardly by gravity successively through an adsorption zone, a primary rectification zone, a secondary rectification zone, a tertiary rectification zone and a desorption zone, introducing said gaseous mixture into said adsorption zone, contacting said gaseous mixture therein with the downwardly moving adsorbent thereby adsorbing the more readily adsorbable constituents from said gaseous mixture to form a rich adsorbent and a substantially unadsorbed gas containing less readily adsorbable constituents, removing said substantially unadsorbed gas from said adsorption zone as a lean gas product, and contacting the said rich adsorbent in said primary rectification zone with a reflux gas containing more readily adsorbable constituents thereby desorbing from said rich adsorbents small quantities of less readily adsorbable constituents absorbed thereon to form an enriched adsorbent, passing a portion of adsorbent containing constituents of intermediate adsorbability together with the least readily adsorbable constituents adsorbed thereon from said adsorption zone and through and independent of said primary rectification zone directly to said secondary rectification zone, contacting the adsorbent thus introduced into said secondary rectification zone with a reflux gas containing more readily adsorbable constituents, thereby desorbing from said adsorbent a gas containing constituents of intermediate adsorbability and forming a partially rectified adsorbent, removing a portion of the thus desorbed gas from said secondary rectification zone as a first side cut gas product, employing the remaining portion of the thus desorbed gas as a reflux gas so as to desorb from said adsorbent introduced into said secondary rectification zone directly from said adsorption zone small amounts of less readily adsorbable constituents adsorbent thereon, passing said enriched adsorbent from said primary rectification zone through and independent of said secondary rectification zone to said tertiary rectification zone, contacting the partially rectified adsorbent in said tertiary rectification zone with most readily adsorbable constitutents thereby desorbing from said partially rectified adsorbent said more readily adsorbable constituents and forming a rectified adsorbent, returning a portion of the thus desorbed constituents to said secondary rectification zone to serve as reflux therein, removing the remaining portion of the thus desorbed constituents as a second side cut gas product, desorbing from said rectified adsorbent with the aid of a stripping gas and indirect heating in said desorption zone the most readily adsorbable constituents adsorbed thereon and forming a lean adsorbent, returning a portion of the thus desorbed constituents to said tertiary rectification zone, removing the remaining portion of the thus desorbed constituents from said desorption zone as a rich gas product, and returning said lean adsorbent from said desorption zone through a cooling zone to said adsorption zone.

3. A process according to claim 1 wherein said solid granular adsorbent comprises activated charcoal.

4. A process according to claim 2 wherein said solid granular adsorbent comprises activated charcoal.

5. A process for the continuous separation of gaseous mixtures containing hydrogen together with hydrocarbons having four carbon atoms per molecule or less into at least four fractions which comprises flowing solid granular charcoal downwardly by gravity successively through a cooling zone, an adsorption zone, a primary rectification zone, a secondary rectification zone, a tertiary rectification zone, a steaming zone and a heating zone, introducing said gaseous mixture into the lower portion of said adsorption zone, contacting said gaseous mixture therein with a downwardly moving bed of cool lean charcoal thereby adsorbing $C_1$ and higher molecular weight hydrocarbons together with a small amount of hydrogen to form a rich charcoal and a substantially unadsorbed gas containing substantially pure hydrogen, removing a portion of said hydrogen from said adsorption zone as a lean gas product, contacting said rich charcoal in said primary rectification zone with a reflux gas containing $C_1$ hydrocarbon thereby desorbing from said charcoal small amounts of adsorbed hydrogen to form an enriched charcoal, removing charcoal which is substantially free of $C_2$ and higher molecular weight hydrocarbons from the central portion of said adsorption zone and passing the thus removed charcoal through and independent of said primary rectification zone and introducing said charcoal into the upper part of said secondary rectification zone, passing charcoal from the lower portion of said primary rectification zone to the central portion of said secondary rectification zone, contacting the combined adsorbent in the lower portion of said secondary rectification zone with a reflux gas containing $C_2$ and higher molecular weight hydrocarbons thereby desorbing from said adsorbent a gas containing substantially pure $C_1$ hydrocarbon and forming a partially rectified charcoal, introducing a portion of the thus desorbed $C_1$ hydrocarbon into said primary rectification zone to serve as reflux therein, removing the remaining portion of desorbed $C_1$ hydrocarbon from said secondary rectification zone as a first side cut gas product consisting of substantially pure $C_1$ hydrocarbon, contacting the partially rectified charcoal in said tertiary rectification zone with a reflux gas consisting of $C_3$ and higher molecular weight hydrocarbons thereby desorbing from said partially rectified charcoal a gas containing $C_2$ hydrocarbons together with some $C_3$ hydrocarbons and forming a rectified charcoal, employing a portion of the thus desorbed $C_2$ and $C_3$ hydrocarbons as reflux in said secondary rectification zone, removing the remaining portion of the thus desorbed $C_2$ and $C_3$ hydrocarbons as a second side cut gas product from said tertiary rectification zone, contacting the rectified charcoal with a stripping gas at low temperature in the absence of indirect heating in said steaming zone thereby desorbing the major portion of $C_3$ and higher molecular weight hydrocarbons adsorbed thereon to form a partially stripped adsorbent and a rich gas, employing a portion of said rich gas as reflux in said tertiary rectification zone, removing the remaining portion of said rich gas from said steaming zone as a rich gas product, subjecting said partially stripped charcoal to indirect heating in said heating zone while contacting said charcoal with a stripping gas thereby causing the substantially complete desorption of adsorbed hydrocarbons to form a hot lean charcoal, removing said hot lean charcoal from said heating zone, conveying said hot lean charcoal to said cooling zone, and therein subjecting said hot lean charcoal to indirect cooling to form said cool lean charcoal.

6. A process for the continuous separation of gaseous mixtures containing hydrogen together with hydrocarbons having three carbon atoms per molecule or less into at least four substantially pure fractions which comprises flowing solid granular charcoal downwardly by gravity successively through a cooling zone, an adsorption zone, a primary rectification zone, a secondary rectification zone, a tertiary rectification zone, a steaming zone and a heating zone, introducing said gaseous mixture into said adsorption zone, contacting said gaseous mixture therein with a downwardly moving bed of cool lean charcoal thereby adsorbing $C_1$ and higher molecular weight hydrocarbons to form a rich charcoal and leaving a substantially unadsorbed gas comprising substantially pure hydrogen, removing a portion of said unadsorbed gas from said adsorption zone as a lean gas product, passing the remaining portion of said unadsorbed gas upwardly through said cooling zone so as to remove from the charcoal therein traces of water vapor and to effect saturation of the charcoal with hydrogen, contacting in said primary rectification zone the rich charcoal thus formed with a reflux gas containing $C_2$ hydrocarbons thereby desorbing from said rich charcoal small amounts of hydrogen together with $C_1$ hydrocarbon adsorbed thereon and forming an enriched charcoal, returning the thus desorbed gases to said adsorption zone, passing a portion of said charcoal present in said adsorption zone which contains hydrogen and $C_1$ hydrocarbon adsorbed thereon through and independent of said primary rectification zone and into said secondary rectification zone, contacting the charcoal thus introduced into said secondary rectification zone with a reflux gas consisting of substantially pure $C_2$ hydrocarbons thereby desorbing from said charcoal the $C_1$ hydrocarbon adsorbed thereon to form a partially rectified charcoal, passing a portion of the thus desorbed $C_1$ hydrocarbon upwardly in contact with charcoal withdrawn from said adsorption zone so as to desorb hydrogen adsorbed thereon, removing the remaining portion of the thus desorbed $C_1$ hydrocarbon from said secondary rectification zone as a first side cut gas product consisting of substantially pure $C_1$ hydrocarbon, passing enriched charcoal formed in said primary rectification zone directly to the central portion of said tertiary rectification zone, contacting charcoal present in the lower portion of said tertiary rectification zone with a reflux gas consisting essentially of $C_3$ hydrocarbons thereby desorbing from said partially rectified charcoal the $C_2$ hydrocarbons adsorbed thereon so as to form a rectified charcoal, employing a portion of the $C_2$ hydrocarbons thus desorbed as said reflux gas in said secondary rectification zone, removing the remaining portion of the $C_2$ hydrocarbons thus desorbed from said tertiary rectification zone as a second side cut gas product consisting of substantially pure $C_2$ hydrocarbons, contacting said rectified charcoal with a stripping gas in said steaming zone in the absence of indirect heating thereby desorbing from said charcoal $C_3$ hydrocarbons adsorbed thereon and thereby forming a partially stripped charcoal, employing a portion of the hydrocarbons thus desorbed as said reflux gas in said tertiary rectification zone, removing the remaining portion of the thus desorbed $C_3$ hydrocarbons from said steaming zone as a rich gas product, subjecting said partially stripped charcoal to indirect heating in said heating zone while contacting said charcoal with further quantities of said stripping gas thereby substantially completely removing from said charcoal any remaining hydrocarbons adsorbed thereon to form a hot lean charcoal, removing said hot lean charcoal from said heating zone, conveying the hot lean charcoal thus removed to said cooling zone, and subjecting said charcoal to indirect cooling while contacting with a portion of said lean gas product so as to form said cool lean charcoal.

7. A process according to claim 5 wherein said stripping gas comprises steam.

8. A process according to claim 6 wherein said stripping gas comprises steam.

9. An apparatus for the continuous separation of normally gaseous mixtures by selective adsorption on solid granular adsorbents which comprises a vertical adsorption column provided at successively lower levels with a cooling zone, an adsorption zone, a primary rectification zone, a secondary rectification zone, a tertiary rectification zone, a steaming zone and a heating zone, means for maintaining a continuous downward flow of solid granular adsorbent through said zones, means for introducing said gaseous mixture into the lower portion of said adsorption zone so as to form a rich adsorbent containing more readily adsorbable constituents adsorbed thereon and a substantially unadsorbed gas containing less readily adsorbable constituents, means for removing a portion of said unadsorbed gas above said cooling zone, means for removing the remaining portion of said unadsorbed gas from above said adsorption zone as a substantially pure lean gas product, means for passing a portion of said adsorbent from the central portion of said adsorption zone through and independent of said primary rectification zone directly to the upper portion of said secondary rectification zone, means for passing said enriched adsorbent from the lower portion of said primary rectification zone to the central portion of said secondary rectification zone, means for removing a first side cut gas product from the upper portion of said secondary rectification zone, means for removing a second side cut gas product from the upper portion of said tertiary rectification zone, means for removing desorbed constituents from the upper portion of said steaming zone as a rich gas product, means in said heating zone for subjecting said adsorbent to indirect heating while contacting said adsorbent with a stripping gas to form a hot lean adsorbent, means for removing said hot lean adsorbent from said heating zone, means for conveying the thus removed adsorbent to said cooling zone, and means in said cooling zone for subjecting said hot lean adsorbent to indirect cooling.

10. An apparatus for the continuous separation of normally gaseous mixtures by selective adsorption on solid granular adsorbents which comprises a vertical adsorption column provided at successively lower levels with a cooling zone, an adsorption zone, a primary rectification zone, a secondary rectification zone, a tertiary rectification zone, a steaming zone and a heating zone, means for maintaining a continuous downward flow of solid granular adsorbent through said zones, means positioned within said adsorption column for conveying a portion of the adsorbent from a central portion of said adsorption zone through and independent of said primary rectification zone and into the upper portion of said secondary rectification zone, means positioned within the said adsorption column to convey the adsorbent from the lower portion of said primary rectification zone through and independent of said secondary rectification zone and into the central portion of said tertiary rectification zone, means for introducing said gaseous mixture into the lower portion of said adsorption zone therein contacting said downwardly moving adsorbent containing more readily adsorbable constituents and forming a rich adsorbent, means for removing from above said adsorption zone a lean gas product containing the least readily adsorbable constituents of said gaseous mixtures, means for removing from the upper portion of said secondary rectification zone a first side cut gas product consisting of substantially pure constituents of intermediate adsorbability, means for introducing into said tertiary rectification zone a rich gas reflux containing most readily adsorbable constituents thereby desorbing from said partially rectified adsorbent constituents which are more readily adsorbable than those present in said first side cut gas product thereby forming a rectified adsorbent, means for removing a portion of the thus desorbed constituents from said tertiary rectification zone as a second side cut gas, means for introducing a stripping gas into said steaming zone thereby desorbing from said rectified adsorbent most readily adsorbable constituents of said gaseous mixture and forming thereby a partially stripped adsorbent, means for returning a portion of the thus desorbed constituents to said tertiary rectification zone to serve therein as said rich gas reflux, means for removing the remaining portion of the thus desorbed constituents as a rich gas product, means in said heating zone for subjecting said partially stripped adsorbent to indirect heating while contacting with further quantities of said stripping gas to form a hot lean adsorbent, means for removing said hot lean adsorbent from said heating zone while controlling the rate of flow of said solid granular adsorbent downwardly therethrough, means for conveying the thus withdrawn adsorbent to said cooling zone, and means in said cooling zone for subjecting said hot lean adsorbent to indirect cooling while passing a portion of said lean gas product upwardly therethrough to form a cool lean adsorbent.

11. An apparatus for the separation of a gaseous mixture by selective adsorption on a solid adsorbent which comprises a vertical adsorption column provided at successively lower levels with an adsorption zone, a primary rectification zone, a secondary rectification zone, a tertiary rectification zone, and a stripping zone, means for permitting downward flow of said adsorbent through said zones, means positioned within said adsorption column for passing a portion of the adsorbent from the central portion of the adsorption zone through and independent of said primary rectification zone into the upper portion of said secondary rectification zone, means for passing another portion of the adsorbent from the lower portion of the primary rectification zone to the central portion of said secondary rectification zone, means for introducing said gaseous mixture into the lower portion of said adsorption zone, and means for removing from the upper portions of said adsorption zone, said secondary rectification zone, said tertiary rectification zone and said stripping zone, respectively, a lean gas, a first side cut gas, a second side cut gas, and a rich gas, of successively increasing degrees of adsorbability.

12. An apparatus for the separation of a gaseous mixture by selective adsorption on a solid adsorbent which comprises a vertical adsorption column provided at successively lower levels with an adsorption zone, a primary rectification zone, a secondary rectification zone, a tertiary rectification zone, and a stripping zone, means for permitting downward flow of said adsorbent through said zones, means positioned within said adsorption column for passing a portion of the adsorbent from the central portion of the adsorption zone through and independent of said primary rectification zone into the upper portion of said secondary rectification zone, means for passing another portion of the adsorbent from the lower portion of the primary rectification zone through and independent of said secondary rectification zone into the central portion of said tertiary rectification zone, means for introducing said gaseous mixture into the lower portion of said adsorption zone, and means for removing from the upper portions of said adsorption zone, said secondary rectification zone, said tertiary rectification zone and said stripping zone, respectively, a lean gas, a first side cut gas, a second side cut gas, and a rich gas, of successively increasing degrees of adsorbability.

13. An apparatus for the separation of a gaseous mixture by selective adsorption on a solid adsorbent which comprises a vertical adsorption column provided at successively lower levels with an adsorption zone, a primary rectification zone, a secondary rectification zone, a tertiary rectification zone, and a stripping zone, means for permitting downward flow of said adsorbent through said zones, means positioned within said adsorption column for passing a portion of the adsorbent from the central portion of the adsorption zone through and independent of said primary rectification zone into the upper portion of said secondary rectification zone, means for introducing said gaseous mixture into the lower portion of said adsorption zone, and means for removing from the upper portions of said adsorption zone, said secondary rectification zone, said tertiary rectification zone and said stripping zone, respectively, a lean gas, a first side cut gas, a second side cut gas, and a rich gas, of successively increasing degrees of adsorbability.

14. In a process for the separation of a gaseous mixture by selective adsorption on a solid adsorbent wherein a portion of said gaseous mixture is adsorbed on said adsorbent in an adsorption zone and unadsorbed gas is withdrawn from said adsorption zone as a lean gas of lowest degree of adsorbability, and a residual adsorbed gas is desorbed from the adsorbent in a stripping zone and a portion thereof is withdrawn from said stripping zone as a rich gas of highest degree of adsorbability, the improvement which comprises obtaining at least two product fractions of intermediate degrees of adsorbability by interposing between said adsorption zone and said stripping zone a primary rectification zone, a secondary rectification zone, and a tertiary rectification zone, passing one portion of the adsorbent from the lower portion of said adsorption zone into the upper portion of said primary rectification zone, passing another portion of the adsorbent from the central portion of said adsorption zone to the upper portion of said secondary rectification zone, passing adsorbent from the lower portion of the secondary rectification zone to the upper portion of the tertiary rectification zone, withdrawing a first side cut gas from the upper portion of the secondary rectification zone, and withdrawing a second side cut gas from the upper portion of said tertiary rectification zone.

15. A process according to claim 5 in which $C_1$, $C_2$, $C_3$ and $C_4$ hydrocarbons are substituted for hydrogen, $C_1$, $C_2$ and $C_3$ hydrocarbons respectively.

16. A process according to claim 6 in which $C_1$, $C_2$, $C_3$ and $C_4$ hydrocarbons are substituted for hydrogen, $C_1$, $C_2$ and $C_3$ hydrocarbons respectively.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,617,960 | Muller | Feb. 15, 1927 |
| 1,784,536 | Pantenburg | Dec. 9, 1930 |
| 1,825,707 | Wagner, Jr. | Oct. 6, 1931 |
| 1,836,301 | Bechthold | Dec. 15, 1931 |
| 2,252,550 | Bragg | Aug. 12, 1941 |
| 2,384,311 | Kearby | Sept. 4, 1945 |